United States Patent
Eguchi

(10) Patent No.: US 12,269,648 B2
(45) Date of Patent: Apr. 8, 2025

(54) DOUBLE CONTAINER AND SEPARATION METHOD THEREOF

(71) Applicant: KYORAKU CO., LTD., Kyoto (JP)

(72) Inventor: Tetsuaki Eguchi, Yamato (JP)

(73) Assignee: KYORAKU CO., LTD., Kyoto (JP)

( * ) Notice: Subject to any disclaimer, the term of this patent is extended or adjusted under 35 U.S.C. 154(b) by 39 days.

(21) Appl. No.: 17/921,156

(22) PCT Filed: Sep. 15, 2021

(86) PCT No.: PCT/JP2021/033961
§ 371 (c)(1),
(2) Date: Oct. 25, 2022

(87) PCT Pub. No.: WO2022/059715
PCT Pub. Date: Mar. 24, 2022

(65) Prior Publication Data
US 2023/0182961 A1    Jun. 15, 2023

(30) Foreign Application Priority Data
Sep. 18, 2020 (JP) ................. 2020-157390

(51) Int. Cl.
*B65D 25/16* (2006.01)
*B65D 1/02* (2006.01)
*B65D 1/32* (2006.01)

(52) U.S. Cl.
CPC ............ *B65D 25/16* (2013.01); *B65D 1/02* (2013.01); *B65D 1/32* (2013.01)

(58) Field of Classification Search
CPC ...... B65D 25/16; B65D 25/14; B65D 1/0215; B65D 1/0207; B65D 1/0246; B65D 1/023; B65D 1/0223
(Continued)

(56) References Cited

U.S. PATENT DOCUMENTS 3,645,414 A * 2/1972 Barr .................. A61J 9/001
    206/390
3,834,570 A * 9/1974 Barr .................. A61J 9/04
    206/390

(Continued)

FOREIGN PATENT DOCUMENTS

CN    101600510 A    12/2009
CN    204021529 U    12/2014
(Continued)

OTHER PUBLICATIONS

Translation of CN101600510, Moretti, Dec. 9, 2009, Paragraph 32. (Year: 2009).*
(Continued)

*Primary Examiner* — Robert J Hicks
(74) *Attorney, Agent, or Firm* — Maier & Maier, PLLC

(57) ABSTRACT

Provided is a double container in which an inner bag can be easily removed from an outer shell.
A double container according to the present invention comprises a container body having an outer shell and an inner bag, wherein: a mouth part of the container body is configured by lamination of the outer shell and the inner bag; the inner bag comprises a flange part at an upper end thereof in the mouth part, the flange part covering the upper end of the outer shell from above; and the flange part comprises a pull-out part for pulling the inner bag out of the outer shell.

13 Claims, 11 Drawing Sheets

(58) Field of Classification Search
USPC ........ 215/12.2, 12.4, 11.3, 44, 43, 352, 341; 220/495.11, 495.08, 495.06, 62.21, 62.12
See application file for complete search history.

(56) References Cited

U.S. PATENT DOCUMENTS

| | | | |
|---|---|---|---|
| 4,238,040 A * | 12/1980 | Fitzpatrick | A61J 9/001 215/274 |
| 4,469,250 A | 9/1984 | Evezich | |
| 2008/0257847 A1* | 10/2008 | Van Hove | B65D 23/02 264/513 |
| 2010/0193460 A1* | 8/2010 | Driver | A61J 9/005 215/11.6 |
| 2019/0329942 A1 | 10/2019 | Sakamoto et al. | |
| 2021/0188474 A1* | 6/2021 | Suzuki | B29B 11/14 |

FOREIGN PATENT DOCUMENTS

| | | |
|---|---|---|
| JP | 2014-69877 A | 4/2014 |
| JP | 2015-163520 A | 9/2015 |
| JP | 2019-10741 A | 1/2019 |
| JP | 2019-119501 A | 7/2019 |
| JP | 2020-55557 A | 4/2020 |
| TW | M569317 U | 11/2018 |
| WO | 0048925 A1 | 8/2000 |
| WO | 02090211 A1 | 11/2002 |

OTHER PUBLICATIONS

Translation of CN204021529, Wu, Dec. 17, 2014, Paragraph 54 (Year: 2014).*
International Search Report issued on Oct. 26, 2021 in corresponding International Application No. PCT/JP2021/033961; 4 pages.
Extended Search Report issued on Feb. 27, 2024, in corresponding European Application No. 21869401.6, 7 pages.
Office Action issued on Aug. 29, 2024, in corresponding Chinese Application No. 202180028381.2, 22 pages.

* cited by examiner

DOUBLE CONTAINER AND SEPARATION METHOD THEREOF

TECHNICAL FIELD

The present invention relates to a double container.

BACKGROUND ART

Conventionally, a double container that comprises a container body having an outer shell and an inner bag has been known. For example, it is disclosed in Patent Literature 1 that the double container (so-called delaminatable container) configured such that the inner bag contracts as content is reduced is molded by biaxially stretching blow molding with an outer shell preform and an inner bag preform overlapped.

CITATION LIST

Patent Literature

[Patent Literature 1] Japanese Unexamined Application Publication No. 2019-10741

SUMMARY OF INVENTION

Technical Problem

Incidentally, in cases where an outer shell and an inner bag of such a double container are molded of different material or where content is adhered to an inside of the inner bag after use, it is desirable to separate the inner bag from the outer shell in recycling the double container.

The present invention has been made by taking these circumstances into consideration. The present invention provides a double container configured such that the inner bag can easily be removed from the outer shell.

Solution to Problem

According to the present invention, a double container comprising a container body having an outer shell and an inner bag, wherein: a mouth part of the container body is configured by lamination of the outer shell and the inner bag; the inner bag comprises a flange part at an upper end part thereof in the mouth part, the flange part covering an upper end of the outer shell from above; and the flange part comprises a pull-out part for pulling the inner bag out of the outer shell, is provided.

According to the present invention, since the flange part comprises the pull-out part, the inner bag can easily be pulled out by pulling up the pull-out part from the upper end of of the outer shell in the mouth part.

The following are examples of various embodiments of the present invention. The embodiments shown below can be combined with each other.

Preferably, the double container comprises a cap configured to be mounted to the mouth part and discharge content, wherein: the pull-out part is formed by at least a part of the flange part protruding radially outward from an outer edge of the upper end of the outer shell; and the cap comprises the holding part for holding the pull-out part in a state that the cap is mounted to the mouth part.

Preferably, the cap comprises a tubular part, wherein: a female screw part is formed on an inner peripheral surface of the tubular part; the female screw part is configured to be engaged with a male screw part formed in the mouth part; and the holding part is an engaging claw formed at a position above the female screw part on the inner peripheral surface of the tubular part and engaged with the pull-out part.

Preferably, the pull-out part is formed by providing a gap in a vertical direction between the upper end of the outer shell and the flange part, the gap being provided at least partly in a circumferential direction.

Preferably, the double container comprises a spacer arranged between the flange part and the upper end of the outer shell, wherein the gap is formed by removing the spacer.

Preferably, the spacer is formed along the circumference direction and is configured to be removable by being divided into two or more parts.

Preferably, the gap is formed by providing a recess on a lower surface of the flange part, the recess being provided partly in the circumferential direction Preferably, the container body is formed by biaxially stretching blow molding with an outer shell preform for forming the outer shell and an inner bag preform for forming the inner bag being combined double.

Preferably, the outer shell preform is the injection-molded preform and the inner bag preform is a blow-molded tubular body.

Preferably, the inner bag is configured to contract as the content is reduced.

Furthermore, according to the present embodiment, provided is a separation method of the above-mentioned double container, the method comprising a step of separating the inner bag from the outer shell by pulling up the pull-out part from the upper end of the outer shell, either by engaging the pull-out part with another member, or by holding the pull-out part.

DESCRIPTION OF EMBODIMENTS

Hereinafter, embodiments of the present invention will be explained. Various distinctive features shown in the following embodiments can be combined with each other. In addition, an invention can be established independently for each of the distinctive features.
1. The First Embodiment
1-1. Configuration of a Double Container 1

Figure 1:
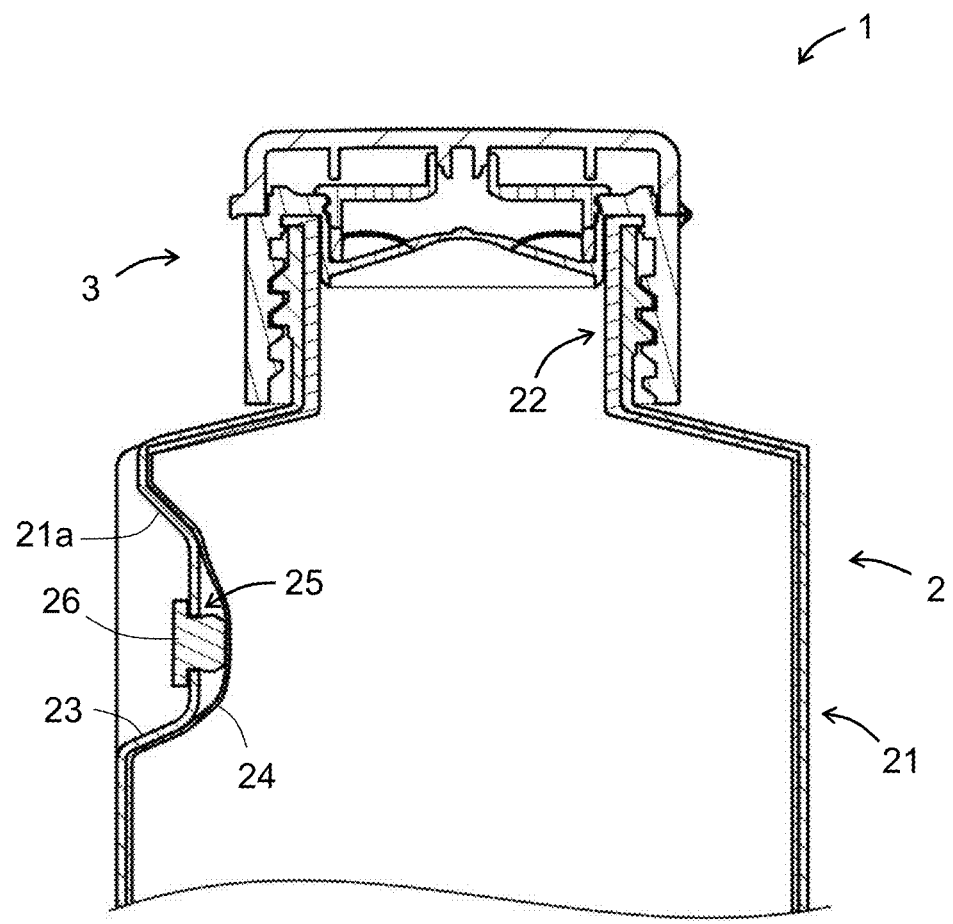
FIG. 1 is a cross-sectional view showing an upper part of a double container 1 of the first embodiment of the present invention.

The double container 1 of the first embodiment of the present invention is so-called squeeze type and comprises a container body 2 and a cap 3 as shown in FIG. 1.

Figure 2:
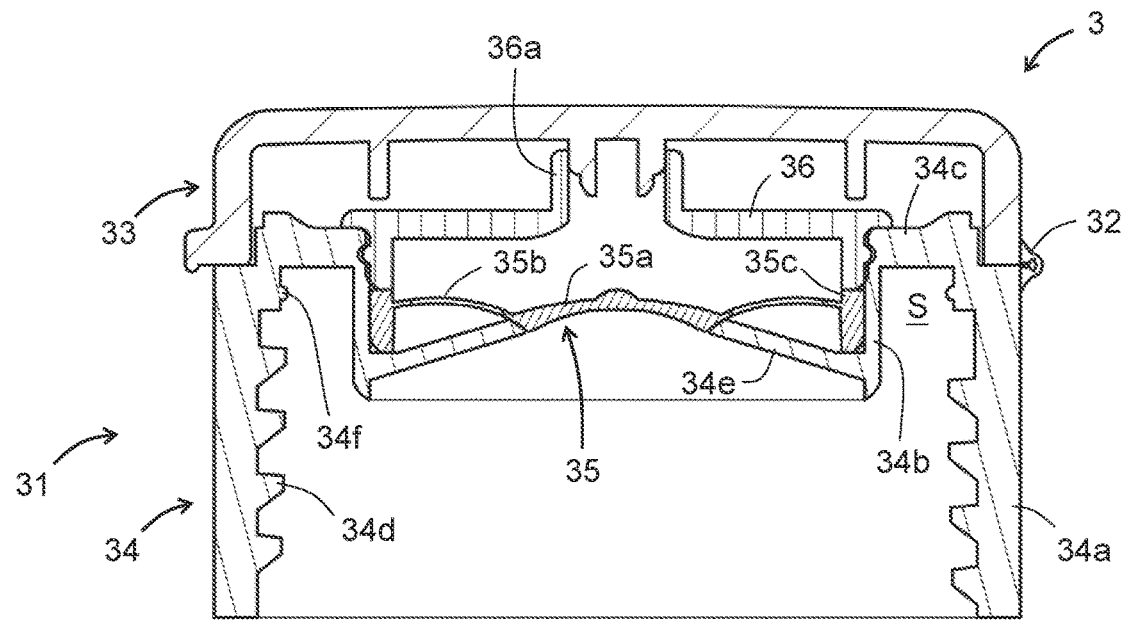
FIG. 2 is an exploded view showing a state before a cap 3 is mounted to a container body 2 in the double container 1 in FIG. 1.
Figure 2:
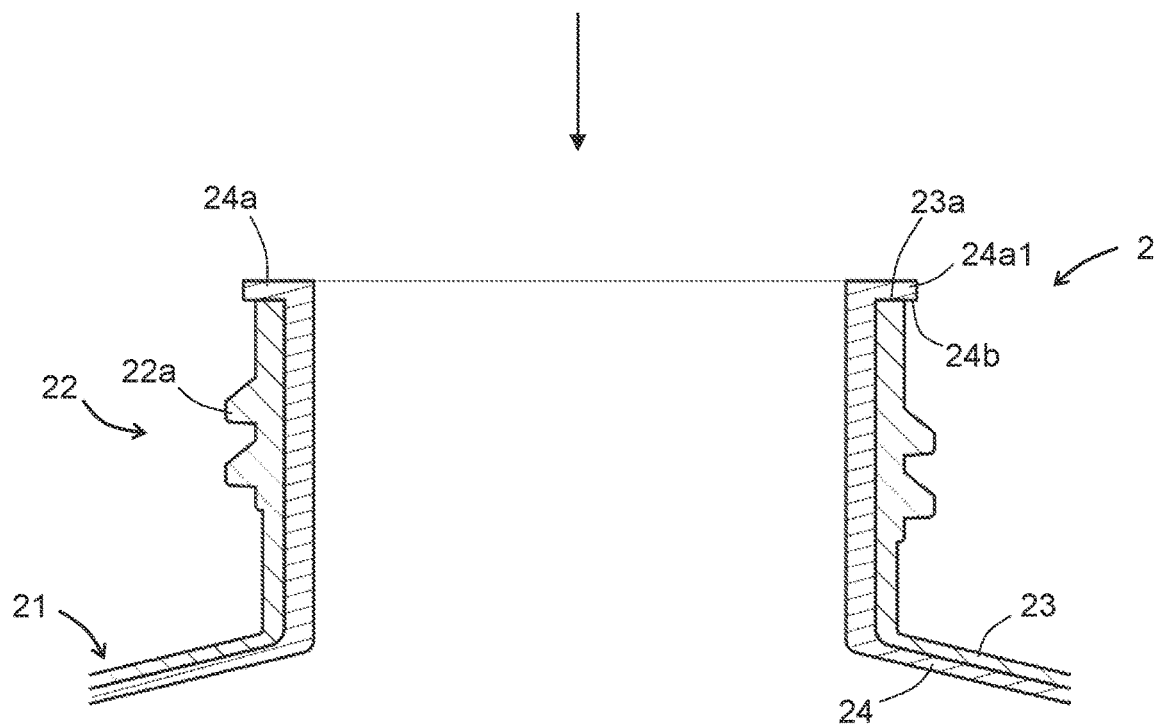
Figure 3:
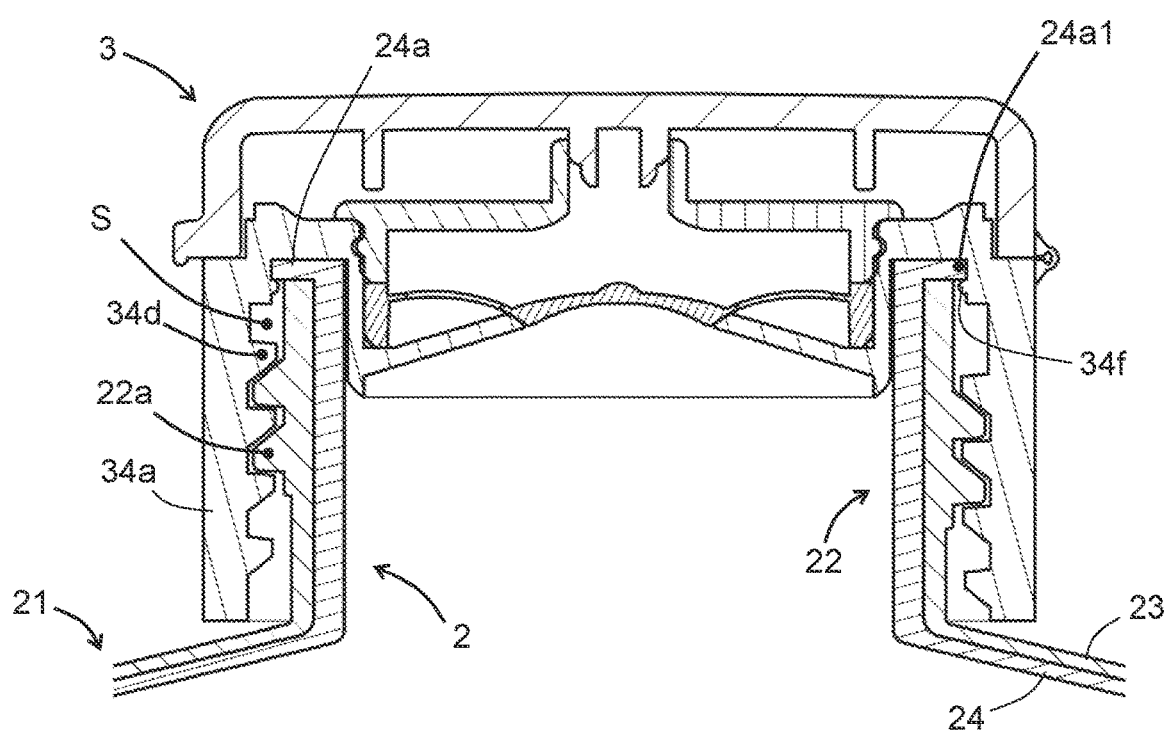
FIG. 3 is an enlarged view showing a state after the cap 3 is mounted to a mouth part 22 of the container body 2 of the double container 1 in FIG. 1.

The container body 2 comprises a storing part 21 for storing content and a mouth part 22 for discharging the content out of the storing part 21. As shown in FIGS. 2 and 3, the mouth part 22 comprises a male screw part 22a capable of mounting the cap 3 thereto.

As shown in FIGS. 1 to 3, the container body 2, that is, the storing part 21 and the mouth part 22, is configured by lamination of an outer shell 23 and an inner bag 24. The outer shell 23 is arranged outside of the inner bag 24. The double container 1 of the present embodiment is so-called a delaminatable container, and the inner bag 24 filled with content is configured to contract off the outer shell 23 as the content is reduced.

As shown in FIG. 1, the outer shell 23 is provided with an outside air introduction hole 25 in a recessed part 21a provided on the storing part 21. The outside air introduction hole 25 is the hole for introducing outside air into an intermediate space between the outer shell 23 and the inner bag 24. A valve member 26 for adjusting an air flow to and from the intermediate space between the outer shell 23 and the inner bag 24 is mounted at the outside air introduction hole 25.

Furthermore, as shown in FIG. 2, the inner bag 24 comprises a flange part 24a at an upper end part thereof in the mouth part, the flange part covering an upper end 23a of the outer shell 23 from above, and a lower surface 24b of the flange part 24a is in contact with the upper end 23a of the outer shell 23. As shown in FIGS. 2 and 3, the flange part 24a comprises a protruding part 24a1 whose tip protrudes along a circumference direction radially outwards from an outer edge of the upper end 23a of the outer shell 23, and the protruding part 24a1 functions as a pull-out part for pulling the inner bag 24 out of the outer shell 23.

Figure 4:
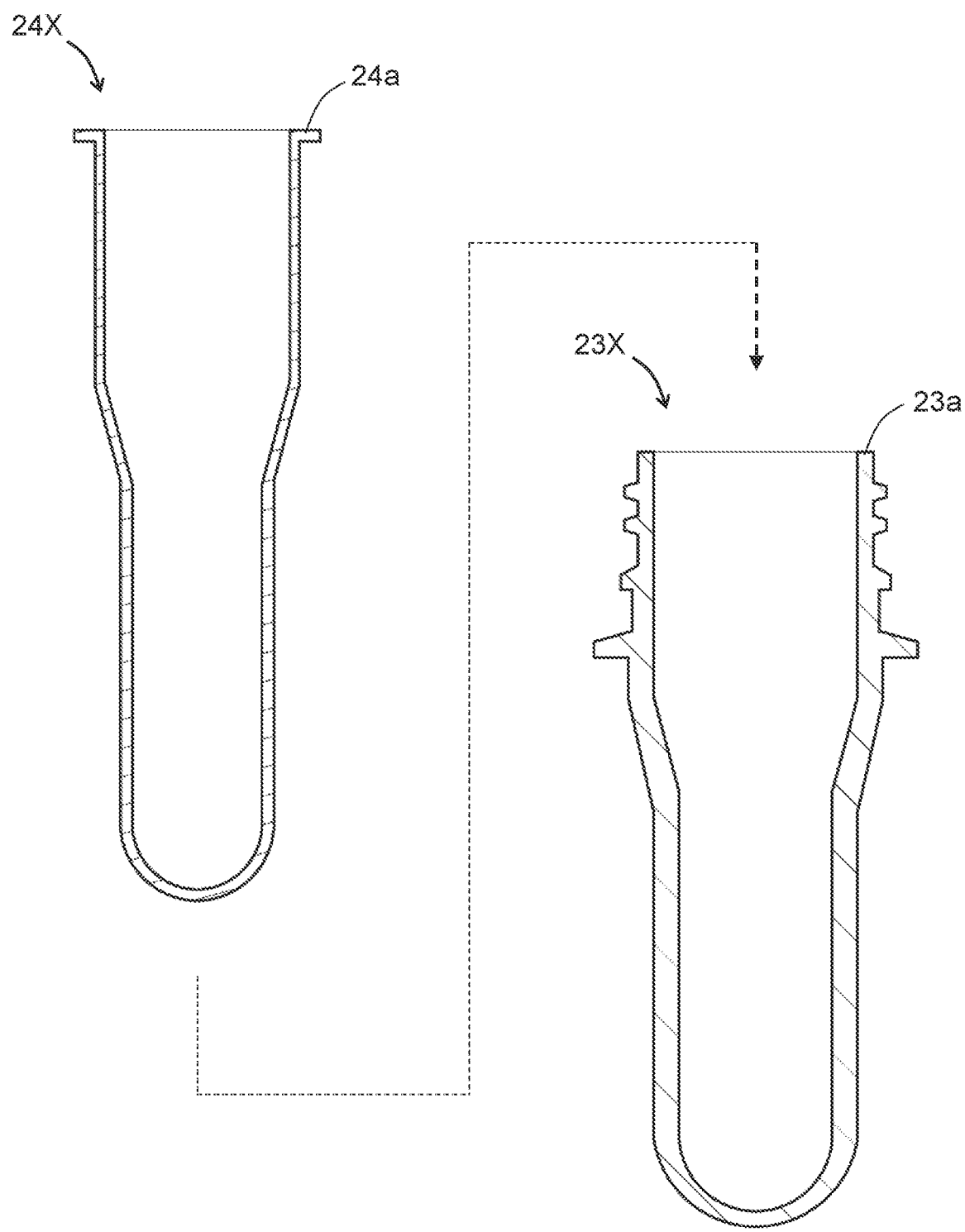
FIG. 4 is a schematic view showing an example of a step of manufacturing the double container 1, the step being mounting an inner bag preform 24X to an outer shell preform 23X.
Figure 5:
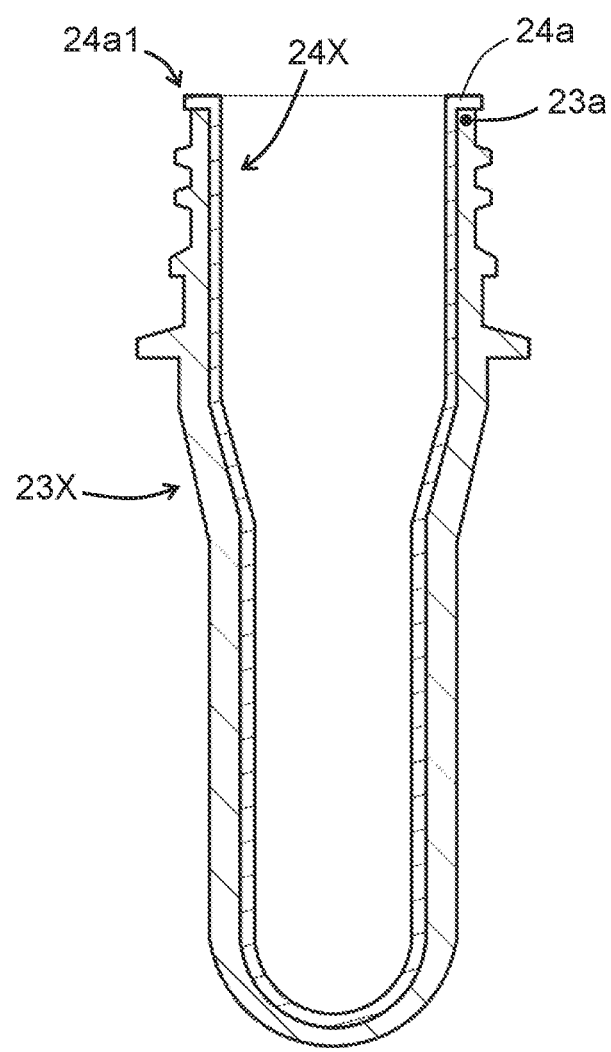
FIG. 5 shows a state of overlapping the outer shell preform 23X with the inner bag preform 24X.

Herein, the container body 2 of the present embodiment is formed as shown in FIGS. 4 and 5 by double combining an outer shell preform 23X for forming the outer shell 23 and an inner bag preform 24X for forming the inner bag 24, and subsequent biaxially stretching blow molding with heating by an infrared heater.

In the present embodiment, the outer shell preform 23X is the preform that has been injection-molded using an injection molding machine (injection-molded preform). However, the outer shell preform 23X can also be molded by extrusion molding or the like. In addition, any thermoplastic resin is cited as an example of constituent material of the outer shell preform 23X and therefore the outer shell 23, and can be selected appropriately depending on usage, performance, or the like of the double container 1. To have the container body 2 restorable and self-standing, for example, a material rigid to some extent is preferably selected as the outer shell 23. As the thermoplastic resin, PET (polyethylene terephthalate) having excellent recyclability is preferably used, and heat-resistant PET is also preferably used. However, PE (polyethylene), PP (polypropylene), PEN (polyethylene naphthalate) and the like can also be used as the thermoplastic resin.

The outer shell 23 can also be constituted of multiple layers. For example, it can be the preform constituted of three or more layers where the intermediate layer is made of the resin having gas barrier property and shading property such as the double-layer preform, Nylon MXD6™, Nylon MXD6™+fatty acid salt, PGA (polyglycolic acid), EVOH (ethylene-vinyl alcohol copolymer) and PEN (polyethylene naphthalate).

Meanwhile, in the present embodiment, the inner bag preform 24X is preferably a tubular body molded by direct blow molding that a tubular parison in a molten state is interposed between a pair of split molds and air is blown into the inside of the parison. However, the inner bag preform 24X can also be molded by injection blow that the preform is reheated and blown. As for the constituent material of the inner bag preform 24X, that is, the constituent material of the inner bag 24 for molding as well, a material quality, an additive, and the like can be selected appropriately depending on functionality to be imparted. However, the constituent material is preferably an olefin-based resin. Low adsorption property, oxygen barrier property, and shading property are cited as the example of functionality to be imparted. For example, using a cyclic polyolefin resin or the like is preferred to impart low adsorption property. Furthermore, using EVOH (ethylene-vinyl alcohol copolymer) is preferred to impart oxygen barrier property, and the EVOH is preferably stretchable type. In addition, coloring material, ultraviolet absorbent, or the like needs to be added to impart shading property. Also, the inner bag 24 preferably has a multilayer configuration, and an olefin multilayer configuration, especially a PE multilayer configuration, is preferred. It should be noted that a material without adhesiveness to the constituent material of the outer shell 23 is preferably selected as the constituent material of the inner bag 24 to have the inner bag 24 delaminatable from the outer shell 23.

Preferably, a layer configuration of the inner bag 24 is, specifically for example, PE layer/repro layer/adhesive layer/EVOH layer/adhesive layer/PE layer in order from the inside of the container. Herein, the repro layer is made of the material used by recycling burrs that are produced when the container body is molded. In the case that an innermost layer of the inner bag 24 is the EVOH layer, the layer configuration of the inner bag 24 is preferably EVOH layer/adhesive layer/EVOH layer/adhesive layer/repro layer/PE layer in order from the inside of the container.

It should be noted that the mouth part 22 is exposed from molds and not blow-molded in biaxially stretching blow molding with the outer shell preform 23X and the inner bag preform 24X overlapped. In other words, a shape of the mouth part 22 of the double container 1 of the present embodiment is determined at a time of molding the outer shell preform 23X and the inner bag 24X. Therefore, the outer shell 23 and the inner bag 24 (including the flange part 24a) in the mouth part 22 are thicker than the outer shell 23 and the inner bag 24 in the storing part 21, respectively, and have high hardness. Besides, in a state of overlapping the outer shell preform 23X with the inner bag preform 24X, the upper end 23a of the outer shell preform 23X is configured to be in contact with the flange part 24a of the inner bag preform 24X (shown in FIG. 5).

The cap 3 comprises a cap body 31 and a cap cover 33 connected to the cap body 31 by a hinge 32, as shown in FIG. 2. The cap body 31 is configured of three members of a main cap member 34, a check valve 35, and a discharge member 36.

The main cap member 34 is configured of an outer tubular part 34a as a tubular part, an inner tubular part 34b arranged inside of the outer tubular part 34a, and an annular part 34c connecting their upper ends to each other. A female screw part 34d engaged with the male screw part 22a in the mouth part 22 of the container body 2 is formed on the inner peripheral surface of the outer tubular part 34a. Furthermore, a valve seat 34e for supporting the check valve 35 is formed inside of the inner tubular part 34b. An insertion space S into which the tip of the mouth part 22 of the container body 2 is inserted is formed between the outer tubular part 34a and the inner tubular part 34b.

The check valve 35 comprises a valve body 35a, an elastic piece 35b extending radially from the valve body 35a, and an annular support part 35c supporting the elastic piece 35b. A lower part of the annular support part 35c is supported by the valve seat 34e, and an upper part of the annular support part 35c is held by engaging the discharge member 36 with the annular part 34c of the cap body 31, fixing the annular support part 35c inside of the inner tubular part 34b of the main cap member 34. At this time, the valve body 35a is seated on the middle of the valve seat 34e. The check valve 35 is configured such that the valve body 35a is pushed up from the valve seat 34e as a pressure in the storing part 21 (in the inner bag 24) increases. Thus, the content in the storing part 21 is dischargeable from a discharge port 36a of a discharge member 36 by squeezing the storing part 21 of the container body 2. In addition, the check valve 35 is configured to be closed by energizing force of the elastic piece 35b of the check valve 35 supporting the valve body 35a when squeezing is stopped. Such a configuration prevents air flow into the inside of the inner bag 24 in the double container 1 of the present embodiment, thereby suppressing deterioration of the content.

The cap 3 of the present embodiment also comprises an engaging claw 34f as a holding part that holds the flange part 24a of the inner bag 24 in a state that the cap 3 is mounted to the mouth part 22 of the container body 2. The engaging claw 34f is provided on the inner peripheral surface of the outer tubular part 34a of the main cap member 34, which is in a vicinity of the annular part 34c. Specifically, the engaging claw 34f is a protrusion that protrudes radially inward, that is, toward the insertion space S. The engaging claw 34f may be formed on the inner peripheral surface of the outer tubular part 34a along the circumferential direction, or only on a part along the circumferential direction if it is engaged with the flange part 24a.

1-2. Mounting of the Cap 3

FIG. 2 is an exploded view showing a state before the cap 3 is mounted to the container body 2, and FIG. 3 is an enlarged view showing a state after the cap 3 is mounted to the mouth part 22 of the container body 2. As shown in FIGS. 2 and 3, the cap 3 of the present embodiment is mounted to the container body 2 by inserting the tip of the mouth part 22 of the container body 2 into the insertion space S and by engaging the female screw part 34d formed on the outer tubular part 34a of the cap 3 with the male screw part 22a formed in the mouth part 22.

Herein, the double container 1 of the present invention has the protruding part 24a1 on a side of the container body 2 where the flange part 24a of the inner bag 24 protrudes radially outward, and the engaging claw 34f on the inner peripheral surface of the outer tubular part 34a of the main cap member 34 on a side of the cap 3. As shown in FIG. 3, in a state that the cap 3 is mounted completely, the protruding part 24a1 and the engaging claw 34f are engaged with each other and the inner bag 24 is held by the cap 3.

1-3. Use of the Double Container 1

The double container 1 to which the cap 3 has been mounted as described above is a squeeze type container and the content can be discharged by compressing the outer shell 23 with the mouth part 22 to which the cap 3 has been mounted being inclined downward. At this time, the valve member 26 is closed as the outer shell 23 is compressed, resulting in an increase in pressure in the intermediate space between the outer shell 23 and the inner bag 24. When the inner bag 24 is compressed due to the increased pressure, the check valve 35 is pushed by the content and put in an open state, the content passing through the check valve 35. The content that passed through the check valve 35 is discharged via the discharge port 36a of the discharge member 36.

When force imparted to the outer shell 23 after discharging of the content is removed, the outer shell 23 attempts to return into an original shape by restoring force. Hereby, pressure in the intermediate space decreases and the valve 26 is put in the open state, the outer shell 23 returning into the original shape owing to an introduction of outside air into the intermediate space via the outside air introduction hole 25. Furthermore, pressure imparted to the content along with a decrease in pressure in the intermediate space also decreases and the check valve 35 is put in a closed state, thereby putting the inner bag 24 in a tightly closed state.

Figure 6:
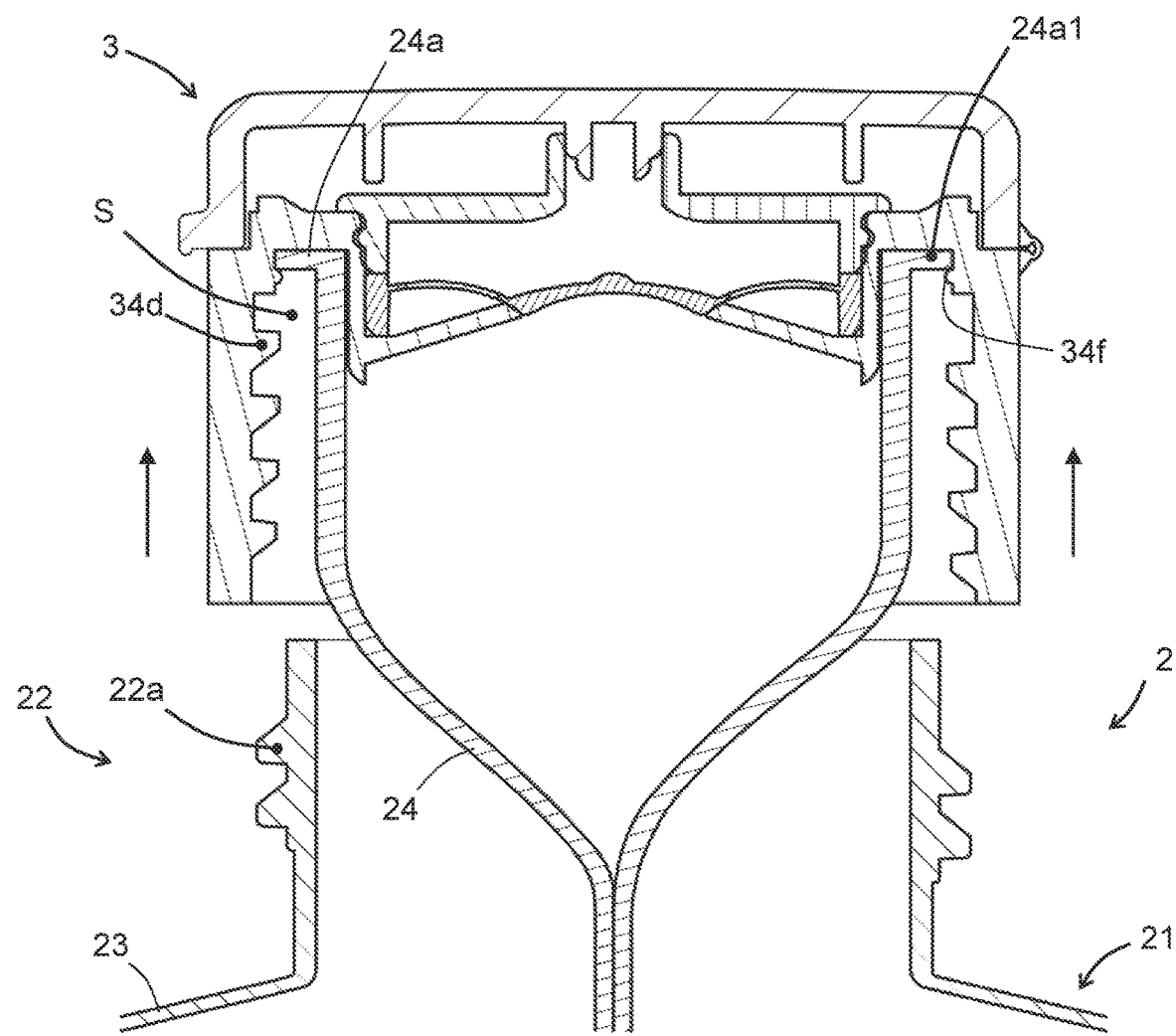
FIG. 6 illustrates removal of the cap 3 from the container body 2 of the double container 1 in FIG. 3.

It should be noted that the inner bag 24 is configured to contract off the outer shell 23 as the content is reduced since it is thin in the storing part 21 (shown in FIG. 6). However, the inner bag 24 has rigidity in the mouth part 22 since it is not blow molded with the outer shell 23 and the inner bag 24 overlapped. Therefore, when using the double container 1, a state of engaging the protruding part 24a1 of the flange part 24a with the engaging claw 34f of the cap 3 is maintained if the inner bag 24 contracts in the storing part 21.

1-3. Separation Method

Hereinafter, a separation method of separating the double container 1 in scrapping (recycling) thereof, specifically a method of separating the outer shell 23 from the inner bag 24 by removing the inner bag 24 out of the outer shell 23 will be explained. It should be noted that in a state that the cap 3 is mounted to the container body 2 before separation, the protruding part 24a1 formed on the flange part 24a of the inner bag 24 is engaged with the engaging claw 34f of the cap 3, leading to the inner bag 24 being held by the cap 3 (shown in FIG. 3).

In scrapping the double container 1, an engagement of the male screw part 22a of the container body 2 with the female screw part 34d of the cap 3 is released by turning the cap 3 and the cap 3 is lifted upward against the container body 2. Since an engagement of the flange part 24a (the protruding part 24a1) of the inner bag 24 with the engaging claw 34f of the cap 3 is maintained, the inner bag 24 is pulled up as the cap 3 is lifted upward, as shown in FIG. 6. Herein, the inner bag 24 can be removed easily from the outer shell 23 since it is in a state of being delaminated off the outer shell 23 after all the content is discharged.

As described above, the separation method of the double container 1 of the present embodiment comprises the step of separating the inner bag 24 from the outer shell 23 by engaging the protruding part 24a1 of the flange part 24a as the pull out part with the engaging claw 34f of the cap 3 as another member and by pulling up the flange part 24a from the upper end 23a of the outer shell 23.

1-4. Action Effect

According to the double container 1 of the present embodiment, the flange part 24a of the inner bag 24 comprises the protruding part 24a1 that protrudes radially outward from the outer edge of the upper end 23a of the outer shell 23, and the protruding part 24a1 functions as the pull-out part for pulling the inner bag 24 out of the outer shell 23. Once the cap 3 is mounted to the container body 2, since the protruding part 24a1 is engaged with the engaging claw 34f of the cap 3, the inner bag 24 can be pulled out of the outer shell 23 by removing the cap 3 from the container body 2 and lifting it up after use. Also, completely pulling the inner bag 24 out of the outer shell 23 enables to easily separate the inner bag 24 from the outer shell 23 and dispose it.

Furthermore, in the case that the double container 1 of the present embodiment is the delaminatable container and, for example, the outer shell 23 is made of PET and the inner bag 24 has the olefin-based multilayer configuration, the inner bag 24 becomes more flexible than in the case that the inner bag 24 is also molded of PET. In the case that the inner bag 24 is molded of PET, since the inner bag does not contract easily, large squeezing force is needed in discharging the content as the content is reduced. However, the inner bag 24 with the olefin-based configuration enables to improve usability in squeezing and discharge the content by the same squeezing force even when the content is reduced. Besides, fabricating the inner bag 24 with biomass PE also enables to have the whole container body 2 made of ecological material.

1-5. Variations of the First Embodiment

Furthermore, the invention of the first embodiment described above can also be implemented in the following aspects.

(1) In the embodiment described above, the flange part 24a of the inner bag 24 comprises the protruding part 24a1 that protrudes along the circumferential direction radially outward from the outer edge of the upper end 23a of the outer shell 23. However, the flange part 24a functions as the pull-out part if at least a part of the flange part 24a protrudes radially outward from the outer edge of the upper end 23a of the outer shell 23. In other words, engaging the protruding part of the flange part 24a with the engaging claw 34f of the cap 3 enables to pull out the inner bag 24 in removing the cap 3.

(2) In the embodiment described above, the mouth part 22 of the container body 2 comprises the male screw part 22a and the cap 3 is screw type comprising the female screw part 34d. However, the cap 3 may be press-fit type. Even if the cap 3 is press-fit type, a configuration to engage the flange part 24a of the inner bag 24 with the engaging claw 34f of the cap 3 when press-fitted enables to remove the cap 3 and pull out the inner bag 24.

(3) In the embodiment described above, the cap 3 comprises the engaging claw 34f that protrudes radially inward as the holding part for holding the flange part 24a (protruding part 24a1). However, the cap 3 may not comprise the engaging claw 34f if the flange part 24a can be held in a state that the cap 3 is mounted. A configuration to clamp the flange part 24a inside the insertion space S (shown in FIG. 2) is cited as an example of another configuration of the holding part.

(4) In the embodiment described above, the protruding part 24a1 formed on the flange part 24a is configured such that it is engaged with the cap 3 and the inner bag 24 is pulled out. However, the inner bag 24 may be separated from the outer shell 23 by not engaging the protruding part 24a1 with the cap 3 and pulling up the flange part 24a from the upper end 23a of the outer shell 23 with the protruding part 24a1 being held after the cap 3 is removed.

2. The Second Embodiment

Hereinafter, the double container 1 of the second embodiment of the present invention will be explained. Since the double container 1 of the present invention is similar to that of the first embodiment, the same constituent elements as in the first embodiment will be omitted in the following.

Figure 7A:
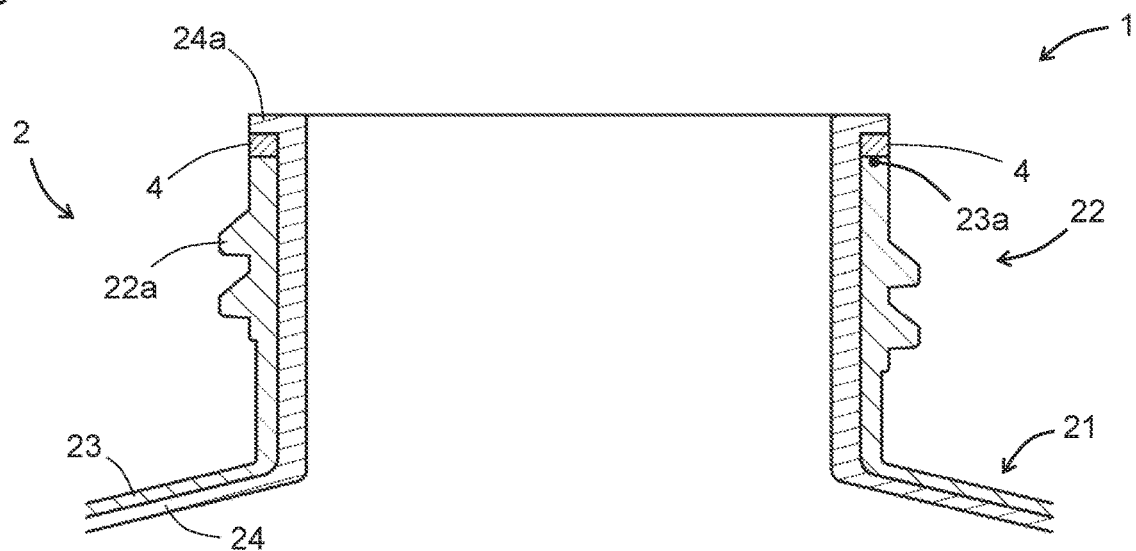
FIG. 7A is a cross-sectional view showing the upper part of the double container 1 of the second embodiment of the present invention.

As for the container body 2 of the double container 1 of the present invention, the flange part 24a of the inner bag 24 does not protrudes radially outward from the outer edge of the upper end 23a of the outer shell 23, as shown in FIG. 7A. Instead, the pull-out part for pulling the inner bag 24 out of the outer shell 23 is formed by providing a gap R (shown in FIG. 8B) in a vertical direction between the upper end 23a of the outer shell 23 and the flange part 24a, the gap R being provided at least partly in the circumferential direction. In other words, the flange part 24a of the present embodiment functions as the pull-out part due to an existence of the gap R between it and the outer shell 23.

Figure 7B:
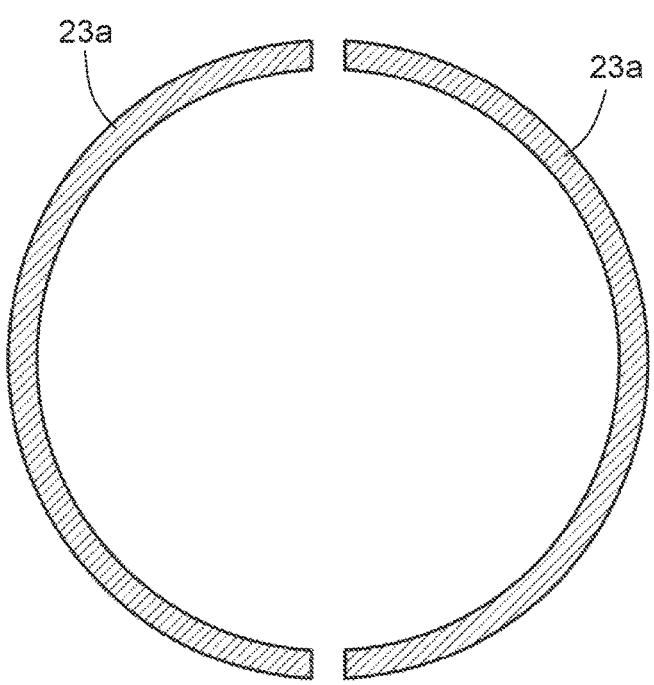
FIG. 7B is a plan view of a spacer 4 the same double container 1 comprises.
Figure 8A:
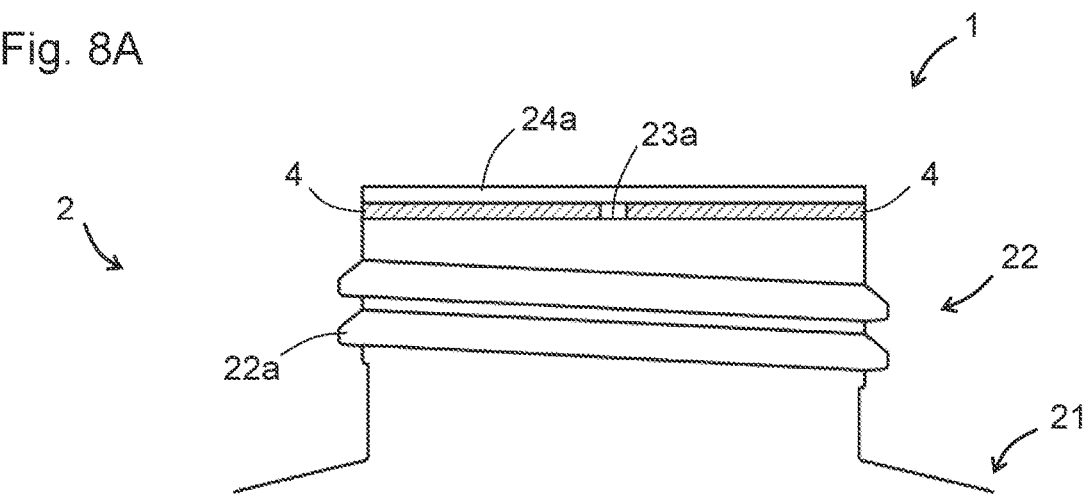
FIG. 8A illustrates a state before removal of the spacer 4 in FIG. 7B.
Figure 8B:
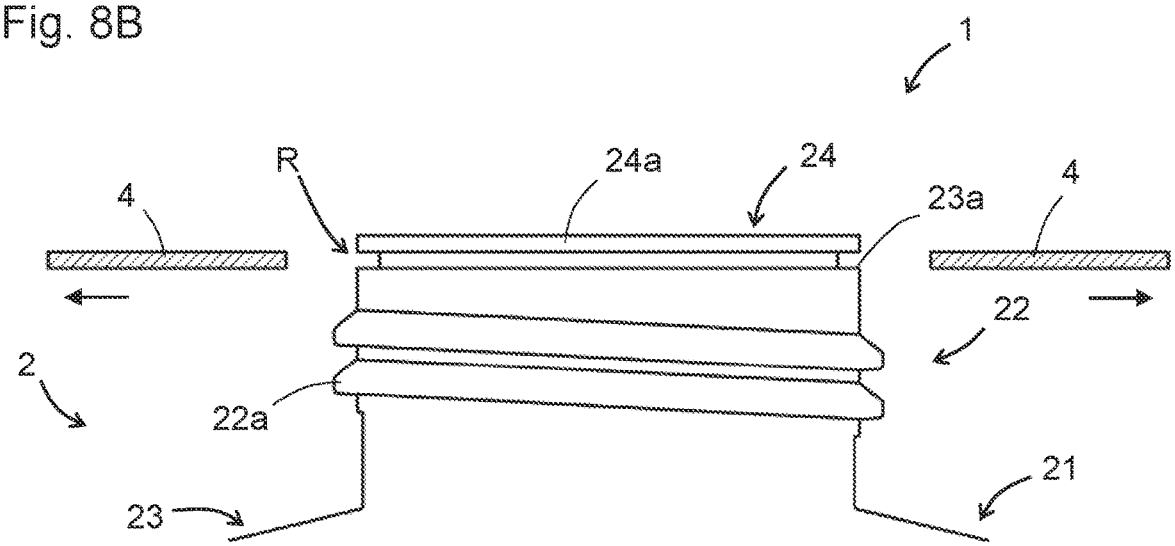
FIG. 8B illustrates a state after removal of the same spacer 4.

Specifically, as for the double container 1 of the present embodiment, a spacer 4 (shown in FIG. 7B) is arranged between the flange part 24a of the inner bag 24 and the upper end 23a of the outer shell 23 in a molding process (e.g., in overlapping the outer shell preform 23X with the inner bag preform 24X as shown in FIG. 4), as shown in FIGS. 7A and 8A. The spacer 4 is arc-shaped and is configured to be removable by being formed along the circumferential direction in the mouth part 22 and being divided into two parts. However, the double container 1 is used as a container with a pair of the divided spacers 4 arranged. When the double container 1 is separated into the outer shell 23 and the inner bag 24 after use of the double container 1, the gap R in the vertical direction is formed between the flange part 24a of the inner bag 24 and the upper end 23a of the outer shell 23 by removing the spacer 4, as shown in FIG. 8B.

Figure 9:
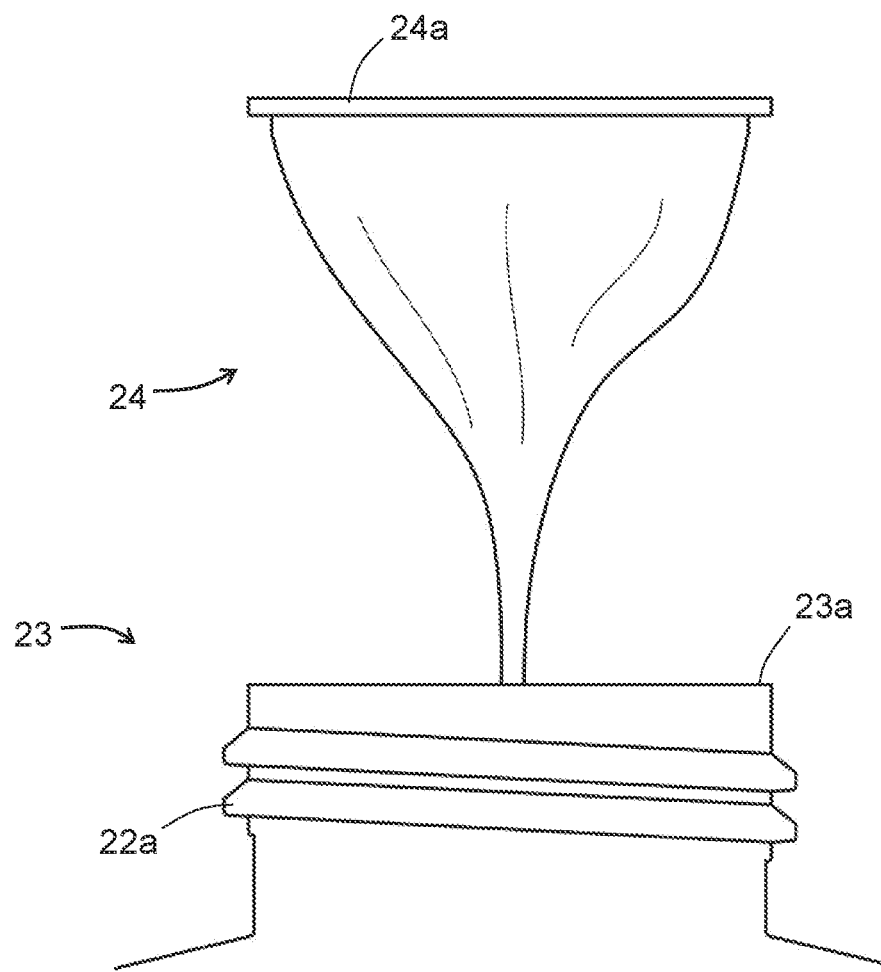
FIG. 9 illustrates how the inner bag 24 is removed out of the outer shell 23 of the double container 1 in FIG. 7A.

The double container 1 of the present embodiment is configured such that the flange part 24a of the inner bag 24 can easily be held in separating the double container 1 and the inner bag 24 can easily be pulled out of the outer shell 23 as shown in FIG. 9.

The pull-out part for pulling the inner bag 24 out of the outer shell 23 can also be configured on the flange part 24a by such a configuration, enabling to easily separate and dispose of the double container 1. In other words, the separation method of separating the double container 1 of the present embodiment comprises the step of removing the spacer 4 arranged between the flange part 24a of the inner bag 24 and the upper end 23a of the outer shell 23, and the step of separating the inner bag 24 from the outer shell 23 by pulling up the flange part 24a from the upper end 23a of the outer shell 23 holding the flange part 24a with the spacer 4 removed.

3. The Third Embodiment

Hereinafter, the double container 1 of the third embodiment of the present invention will be explained. Since the double container 1 of the present embodiment is similar to that of the first embodiment, the same constituent elements as in the first embodiment will be omitted in the following.

Figure 10:
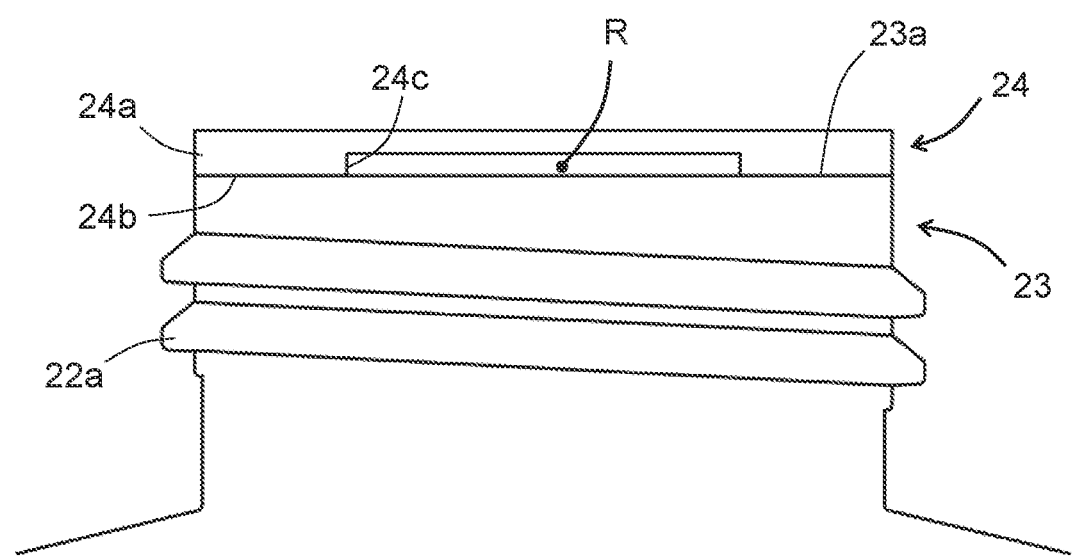
FIG. 10 is a schematic view showing the mouth part 22 of the double container 1 of the third embodiment of the present invention.

As for the container body 2 of the double container 1 of the present embodiment, the flange part 24a of the inner bag 24 does not protrude radially outward from the outer edge of the upper end 23a of the outer shell 23, as shown in FIG. 10.

In the present embodiment, similarly to the second embodiment, the pull-out part for pulling the inner bag 24 out of the outer shell 23 is formed by providing the gap R in the vertical direction between the upper end 23a of the outer shell 23 and the flange part 24a, the gap R being provided at least partly in the circumferential direction. In other words, the flange part 24a of the present embodiment functions as the pull-out part due to the existence of the gap R between it and the outer shell 23.

Specifically, in the double container 1 of the present embodiment, the gap R is formed by providing the recess 24c on the lower surface 24b of the flange part 24a, the recess 24c being provided partly in the circumferential direction. For example, the recesses 24c are preferably provided at two places facing each other in the circumferential direction. However, the number and shape of the recess 24c can be designed optionally if the inner bag 24 can easily be pulled out by picking the flange part 24a with fingers.

Figure 11:
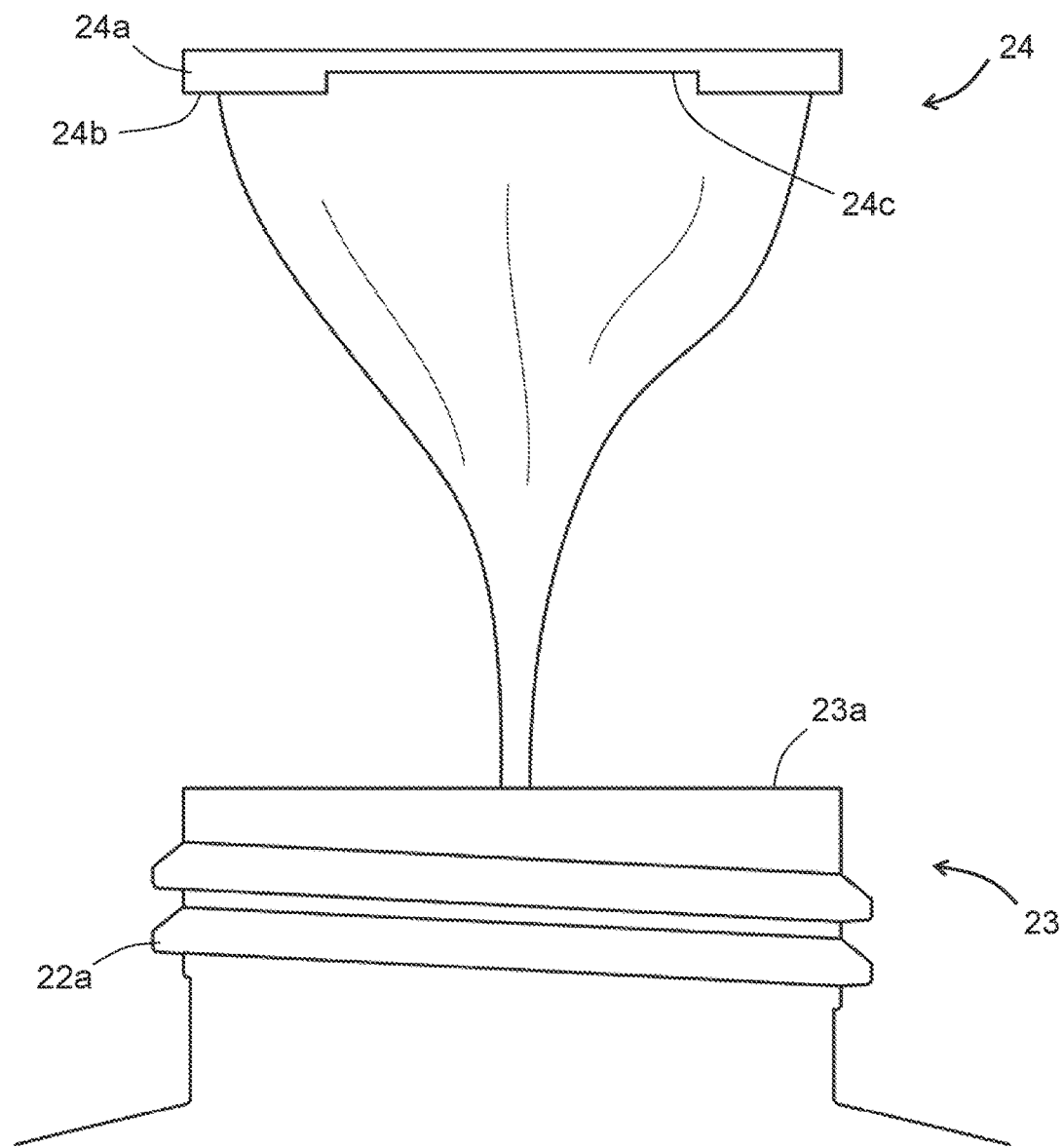
FIG. 11 is a schematic view showing how the inner bag 24 is removed out of the outer shell 23 of the double container 1 in FIG. 10.

As for the double container 1 of the present embodiment, formation of the gap R enables to hold the flange part 24a of the inner bag 24 in separating the double container 1, thereby leading to easily pulling the inner bag 24 out of the outer shell 23, as shown in FIG. 11.

The pull-out part for pulling the inner bag 24 out of the outer shell 23 can also be configured at the flange part 24a by such a configuration, enabling to easily separate and dispose of the double container 1. In other words, the separation method of the double container 1 of the present embodiment comprises the step of separating the inner bag 24 from the outer shell 23 by pulling up the flange part 24a from the upper end 23a of the outer shell 23 holding the flange part 24a having the recess 24c.

Furthermore, allowed is a configuration such that the cap 3 comprising the protrusion engaged with the recess 24c is mounted to the container body 2 having a configuration of the inner bag 24 of the present embodiment and, similarly to the first embodiment, the inner bag 24 is pulled out by removing the cap 3.

4. Other Variations

In the above-mentioned embodiment, the double container 1 is squeeze type and configured such that the content is discharged by compressing the outer shell 23 with the mouth part 22 being inclined downward. However, the double container 1 can be pump type such that the pump is attached to the mouth part 22 and the content is suctioned by pumping via the tube inserted to the inside of the inner bag 24 and discharged. When the double container 1 is pump type, preferred is a configuration such that the outside air introduction hole 25 and the valve 26 are not provided and outside air is introduced via a bottom part with the bottom part of the storing part 21 opened.

The double container 1 of the above-mentioned embodiment is the delaminatable container configured such that the inner bag 24 contracts as the content is reduced. However, the inner bag 24 of the double container 1 of the present invention may not contract when it is in use. In other words, in this case, the inner bag 24 is not adhered to the outer shell 23, albeit not delaminatable, and is configured to be separated easily from the outer shell 23. Thus, even the double container 1 whose the inner bag 24 is not delaminatable when in use can be separated from the outer shell 23 and disposed of by removing the inner bag 24 after use. By this configuration, it is possible to use a PET container as a container for dressing or sauce that is generally though unsuited for recycling. In other words, since a material having excellent oxygen barrier property is used as the inner bag 24 and the inner bag 24 can be removed after use, the outer shell 23 made of PET without adhered content is recyclable.

REFERENCE SIGN LIST

1: double container, 2: container body, 3: cap, 4: spacer, 21: storing part, 21a: recessed part, 22: mouth part, 22a: male screw part, 23: outer shell, 23x: outer shell preform, 23a: upper end, 24: inner bag, 24x: inner bag preform, 24a: flange part, 24a1: protruding part (pull-out part), 24b: lower surface, 24c: recess, 25: outside air introduction hole, 26: valve member, 31: cap body, 32: hinge, 33: cap cover, 34: main cap member, 34a: outer tubular part (tubular part), 34b: inner tubular part, 34c: annular part, 34d: female screw part, 34e: valve seat, 34f: engaging claw (holding part), 35: check valve, 35a: valve body, 35b: elastic piece, 35c: annular support part, 36: discharge member, 36a: discharge port, R: gap, S: insertion space

The invention claimed is:

1. A double container comprising a container body having an outer shell and an inner bag, wherein:
   a mouth part of the container body is configured by lamination of the outer shell and the inner bag;
   the inner bag comprises a pull-out part for pulling the inner bag out of the outer shell in the mouth part; and
   the double container further comprising the following configuration (1) or configuration (2):
   (1) the double container comprises a cap configured to be mounted to the mouth part and discharge content, wherein the cap comprises a holding part for holding the pull-out part in a state that the cap is mounted to the mouth part, and the inner bag is pulled out of the outer shell by lifting the cap after use, wherein an upper end of the outer shell is in contact with the inner bag along the entire circumference in a circumferential direction;
   (2) the inner bag comprises a flange part at an upper end thereof in the mouth part, the flange part extending horizontally outward in the radial direction and covering the upper end of the outer shell from above, and the pull-out part is formed by providing a gap in a vertical direction between the upper end of the outer shell and the flange part, the gap being provided at least partly in a circumferential direction, and a spacer is arranged between the flange part and the upper end of the outer shell, wherein the gap is formed by removing the spacer.

2. The double container of claim 1 with the configuration (1), wherein:
   the pull-out part is formed by at least a part of the flange part extending horizontally outward in the radial direction and protruding radially outward from an outer edge of the upper end of the outer shell.

3. The double container of claim 2, wherein:
   the cap comprises a tubular part;
   the tubular part comprises an engaged part on an inner peripheral surface thereof;
   the engaged part is configured to be engaged with an engaging part formed in the mouth part; and
   the holding part is an engaging claw formed at a position above the engaged part on the inner peripheral surface of the tubular part and engaged with the pull-out part.

4. The double container of claim 1 with the configuration (2), wherein the gap opens radially outward.

5. The double container of claim 4, wherein the gap is formed by providing a recess on a lower surface of the flange part, the recess being provided partly in the circumferential direction.

6. The double container of claim 1, wherein the spacer is formed along the circumference direction and is configured to be removable by being divided into two or more parts.

7. The double container of claim 1, wherein the container body is formed by biaxially stretching blow molding with an outer shell preform for forming the outer shell and an inner bag preform for forming the inner bag being combined.

8. The double container of claim 7, wherein:
the outer shell preform is an injection-molded preform; and
the inner bag preform is a blow-molded tubular body.

9. The double container of claim 1, wherein the inner bag is configured to contract as content is reduced.

10. A method of separating the double container of claim 1, comprising a step of separating the inner bag from the outer shell by pulling up the pull-out part from the upper end of the outer shell, either by engaging the pull-out part with another member or by holding the pull-out part.

11. The double container of claim 1, wherein the double container is squeezable and content can be discharged by compressing the outer shell.

12. The double container of claim 1 with the configuration (1), wherein the container body comprises the mouth part and a storing part for storing the content;
the outer shell is provided with an outside air introduction hole on the storing part; and
a valve member for adjusting an air flow to and from the intermediate space between the outer shell and the inner bag is mounted at the outside air introduction hole.

13. A double container comprising a container body having an outer shell and an inner bag, the double container is so configured that the inner bag does not contract when in use, wherein:
a mouth part of the container body is configured by lamination of the outer shell and the inner bag;
the inner bag comprises a pull-out part for pulling the inner bag out of the outer shell in the mouth part; and
the double container further comprising the following configuration (1) or configuration (2):
(1) the double container comprises a cap configured to be mounted to the mouth part and discharge content, wherein the cap comprises a holding part for holding the pull-out part in a state that the cap is mounted to the mouth part, and the inner bag is pulled out of the outer shell by lifting the cap after use;
(2) the inner bag comprises a flange part at an upper end thereof in the mouth part, the flange part extending horizontally outward in the radial direction and covering an upper end of the outer shell from above, and the pull-out part is formed by providing a gap in a vertical direction between the upper end of the outer shell and the flange part, the gap being provided at least partly in a circumferential direction.

* * * * *